Figure 1:
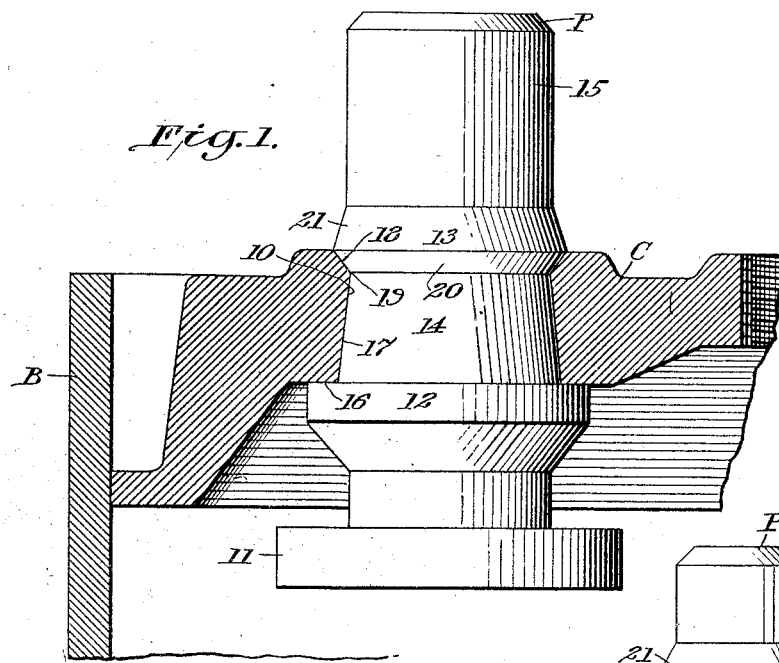

Sept. 2, 1924.  
W. E. GOSSLING  
POST AND COVER SEALING MEANS  
Filed July 30, 1920

1,507,114

Inventor:  
Walter E. Gossling,  
by Byrnes Townsend & Brickenstein  
Attorneys.

Patented Sept. 2, 1924.

1,507,114

UNITED STATES PATENT OFFICE.

WALTER E. GOSSLING, OF NEW YORK, N. Y., ASSIGNOR TO THE PREST-O-LITE COMPANY, INC., A CORPORATION OF NEW YORK.

POST AND COVER SEALING MEANS.

Application filed July 30, 1920. Serial No. 400,013.

*To all whom it may concern:*

Be it known that I, WALTER E. GOSSLING, a citizen of the United States, residing at New York, in the county of New York and State of New York, have invented certain new and useful Improvements in Post and Cover Sealing Means, of which the following is a specification.

This invention relates to an improved post and cover seal especially adapted for sealing the terminal post of a storage battery into an opening in the cell cover thru which such post projects, and the invention relates further to the method of assembling such post and cover and effecting such seal. It will appear, however, that the principles of the invention may also be adapted for the purpose of sealing a similar rod-like member in the opening in a similar plate-like member.

In types of storage batteries embodying cells having covers of hard rubber or similar non-corrodible relatively rigid and resilient or elastic material thru which a terminal post extends, it is practically necessary to provide an air-tight acid-proof seal at the joint between the post and opening in the cover to prevent the leakage of electrolyte and air and to prevent evaporation of the electrolyte at this point. The principal object of this invention is, therefore, to provide a simple and efficient post and cover seal that will maintain an air-tight and acid-proof seal between a storage battery terminal post and the wall of an opening in the cell cover through which such post projects.

Speaking in general terms, the present invention depends for its advantages upon the fact that the wall of the opening in the cell cover that receives the terminal post is of comparatively rigid but expansible and contractible material such as hard rubber that will expand a sufficient amount to allow the passage therethru of a collar or shoulder on the terminal post that is of greater diameter than the opening, and thereafter will contract into intimate sealing engagement with the portion of the terminal post within the opening, thereby affording an air-tight and acid-proof seal at the joint between the post and cover, and also rigidly securing the post in place on the cover.

The above and other objects and the novel features of the invention will be apparent from the following description taken in connection with the drawing, in which—

Figure 3:
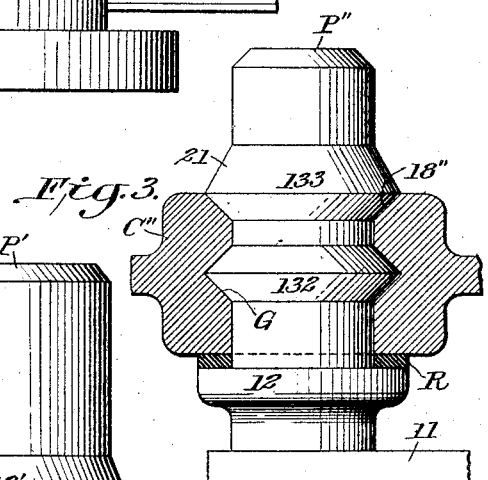
Figure 2:
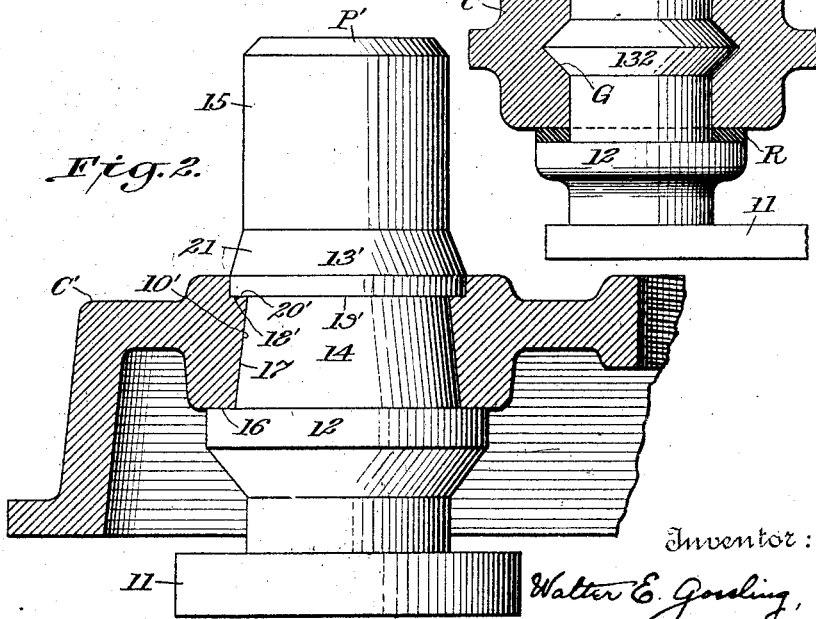

Figs. 1, 2 and 3 illustrate portions of storage battery cell covers and terminal posts applied thereto in accordance with the principles of this invention.

Referring to Fig. 1 of the drawings, B designates a portion of the container or jar of a storage battery cell of the usual or any preferred type, the jar being of suitable acid-proof or non-corrodible material and adapted to contain the usual storage battery elements such as plates, separators and electrolyte.

The upper end of the jar B is provided with a suitable closure to prevent leakage and evaporation of the electrolyte therein, and in the present instance, such closure comprises a cover plate C of suitable non-corrodible relatively rigid but resilient or elastic material such as hard rubber, which is formed into a suitable shape to close the upper end of the container B.

The cover member C is provided with a suitable opening 10 which extends therethru to receive a terminal post P of the usual or a preferred construction, which is adapted to electrically connect plates within the cell to the external circuit of the storage battery. In accordance with the broad principles of the present invention, the wall of the opening 10 in the cell cover C is maintained in intimate sealing relation to the adjacent portion of the terminal post P by the inherent resiliency of the material of which the said wall is composed, and the terminal post is maintained in position in the said opening by the frictional engagement between the wall of the opening and the terminal post, and by suitable means formed integral with the terminal post P. The foregoing principles may be carried out in a number of ways and I have herein disclosed constructions by means of which the advantageous results of these principles are obtained.

The lower or inner end of the post P has a plate strap 11 formed integral therewith in the usual manner, such strap being adapted to be electrically connected to the plates within the cell. Intermediate the ends of the post and above the plate strap 11 there are suitable collars or shoulders 12 and 13 formed integral with the post P and spaced apart a distance substantially equal to the thickness of the cover C adjacent to the opening 10. The collars 12 and 13 are of larger diameter than the opening 10, which is of substantially circular or other suitable cross-section and normally substantial the same size as, or of a shape to closely fit, the portion 14 of the post P that is disposed between the shoulders 12 and 13.

In assembling the post P in the opening in the cover C, the upper end 15 of the post above the collar 13 is inserted in the opening 10 from the under side of the cover, and by applying suitable pressure axially of the post the shoulder 13 may be forced through the opening 10 until the upper side 16 of the collar 12 abuts against the inner or lower side of the cover C and the inner side of the shoulder 13 abuts against or is adjacent to the upper side of the cover C. Since the cover C is of elastic or resilient material, the opening 10 therein will expand sufficiently to permit the passage therethru of a collar or shoulder 13 that is slightly greater in diameter than said opening.

In order to facilitate forcing the shoulder 13 thru the opening 10 and to provide a better wedging engagement between the wall of the opening and the post P, the said opening is formed of two oppositely tapering or flaring sections 17 and 18 which merge into one another at the smallest section 19 of the opening 10, which section 19 is adjacent the upper end of the opening. In order that the post shall conform closely to the tapering sections 17 and 18 of the opening 10, the portion 14 of the post and the lower side 20 of the collar 13 are respectively tapered to correspond to such tapering portions of the opening 10. The upper side 21 of the collar 13 gradually tapers inwardly and upwardly to the diameter of the conductor-retaining portion 15 of the post. When the post and cover are forced together, the gradually tapering part 21 cooperates with the wall of the opening 10 to gradually expand the opening and thereby prevents sudden strains in the material and damage to the cover. The cover may also be made of material which when sufficiently heated becomes sufficiently elastic to permit a terminal post of the character described to be assembled in an opening therein.

When the shoulder 13 has been forced through the opening 10 and the shoulder 16 abuts against the lower side of the cover, the tension on the wall of the opening 10 is released and such wall contracts to its normal size and closes tightly around the tapering portions 14 and 20 of the terminal post P to form an air-tight acid-proof seal between the post and the cover. The shoulder 16 also is drawn into tight engagement with the underside of the cover and supplements the sealing action of the wall of the opening 10.

In Fig. 2 is illustrated another post and cover connecting means and seal embodying this invention. Features of this figure which correspond exactly to those disclosed in Fig. 1 are designated by the same reference characters. In the arrangement of Fig. 2, the post P' and cover C' are somewhat more securely interlocked by the abrupt shoulder 18' of the cover which engages a corresponding shoulder 20' on the post. The wall of the opening 10' of course contracts into intimate sealing relation to the surface of the terminal post, which in each case may desirably be of a soft, non-corrodible metal such as antimony-lead alloy. Accordingly, the resilient wall of the opening and the metal of the terminal post will flow into one another to a slight extent and frictionally engage one another to supplement the mechanical connection between the parts.

The post may of course, be provided with more than one collar above the collar 12, and Fig. 3 illustrates another post and cover seal embodying my invention in which the post P'' is provided with two spaced collars or enlarged portions 132 and 133 having beveled faces whereby the post may be more readily forced through the opening in the cover plate until the upper side of the collar 12 lies adjacent to or abuts against the inner side of the hard rubber cover C''. The arrangement is desirably such that when the post is in place, the lower side of the upper collar 133 bears against the seat 18'' and the intermediate collar 132 fits tightly a correspondingly shaped groove G in the wall of the hole in the cover. A gasket ring R of suitable material may be placed so as to be clamped between the shoulder 12 and the inner side of the cover around the joint between the opening in the latter and the post. A gasket ring may similarly be applied to the structures shown in Figs. 1 and 2.

In all forms of the invention, when applying the post to the cover, the latter may be heated to increase its resiliency or elasticity to facilitate the insertion of the post, and upon cooling, the opening in the cover will contract to produce a sealing joint between the wall of the opening and the post. In Figs. 1 and 3, the opposite sides of the collar taper inwardly to the post so the latter may be readily withdrawn from the hole in the cover by applying axial force in the opposite direction and desirably heating the cover to facilitate such withdrawal. The terminal post and the parts cooperating therewith, may be of rectangular or other suitable section instead of the circular section herein disclosed.

While I have shown and described this invention in detail, it is to be understood that various features thereof may be modified without departing from the spirit of the invention or sacrificing any of the advantages thereof, and accordingly I do not wish to be limited to the exact constructions disclosed.

I claim:

1. A method of securing a storage battery terminal post having spaced shoulders to a cell cover provided with an opening therethrough having a hard rubber wall initially of a shape to closely fit the part of said post between said shoulders, which comprises forcing said post into position in said opening and thereby expanding a portion of said hard rubber wall, the inherent resiliency of said hard rubber thereafter causing the expanded portion of said wall to contract into close contact with said post.

2. A method of securing a storage battery terminal post having spaced shoulders to a cell cover provided with an opening therethrough having a hard rubber wall initially substantially of a shape and size to closely fit the part of said post between said shoulders, which method comprises heating said cover and forcing said post into position in said opening and thereby expanding a portion of said hard rubber wall, and then allowing the inherent resiliency of the hard rubber to contract said expanded part into close contact with said post.

3. A post and cover seal for storage batteries, comprising the combination of a cover of expansible and contractible relatively rigid material having an opening therethrough, and a terminal post projecting through said opening and having spaced integral shoulders formed thereon prior to assembly and cooperating with the inner and outer sides of said cover to retain said post in place, the wall of said opening being relatively rigid and integral with said cover and substantially the size of the portion of said post between said shoulders, said wall being initially expanded by the assembly of said post therein and thereafter contracted into sealing engagement with such portion of said post.

4. A post and cover seal for storage batteries, comprising the combination of a cover of expansible and contractible, relatively rigid material having an opening therethrough, and a terminal post projecting through said opening and having spaced integral shoulders formed thereon prior to assembly and cooperating with the inner and outer sides of said cover to retain said post in place, the outer shoulder cooperating with the outer side of said cover having a tapering upper side, the wall of said opening being integral with said cover and of substantially the size of the portion of said post between said shoulders and adapted to be initially expanded to assemble said post therein, and thereafter contracted into sealing engagement with such portion of said post, such tapering side facilitating the passage of said outer shoulder through said opening.

5. A post and cover seal for storage batteries comprising the combination of a cover member having an opening therethrough, and a terminal post projecting through said opening and having spaced shoulders formed thereon prior to assembly and cooperating with parts of said cover to retain said post in said opening, the wall of said opening being of hard rubber or the like and initially formed to closely fit the portion of said post between said shoulders and adapted to expand and contract during the operation of assembling said post therein.

6. A post and cover seal for storage batteries comprising, in combination, a cell cover of non-corrodible elastic material having an opening therethrough provided with a wall having portions tapering in opposite directions, a storage battery terminal post having an integral plate strap extending laterally from the lower end thereof and initially formed integral spaced shoulders above said strap and intermediate the ends of said post, a portion of said post between said shoulders being substantially the same size as a tapering portion of said opening and the lower side of the upper shoulder substantially conforming in size to the upper tapering portion of said opening, the lower shoulder abutting against the lower side of said cover, said upper shoulder being adapted to be forced through said opening in assembling the post on the cover and having a tapering upper side to facilitate such assembling operation, the wall of said opening contracting into sealing relation to the adjacent portion of said post after said tapering shoulder has been forced through said opening.

7. The method of assembling and sealing the joint between a post or similar rod-like member carrying spaced collars or shoulders and a cover or similar plate-like member having an opening normally substantially the same size as that portion of the post between such collars and provided with an integral wall of expansible and contractible but comparatively rigid material, such method comprising inserting said post in said opening and forcing one of said collars therethrough by expanding the wall of said opening with such collar, such wall being sufficiently contractible or resilient to return to its normal size and into sealing relation with the portion of the post between said collars.

8. The method of assembling and sealing the joint between a storage battery terminal post carrying spaced collars and a plate strap, and a cell cover of resilient expansible and contractible relatively rigid non-corrodible material having an opening therethrough normally of substantially the same size as that portion of the post between said collars, such method comprising inserting said post in said opening and forcing the same part way therethrough by expanding the opening with the upper of such collars, and limiting the position of said post by the abutment of the lower collar against the lower side of said cover, whereby the resilient contractible wall of said opening is free to return to its normal size and into sealing engagement with the portion of the post between said collars.

9. A post and cover seal for storage batteries comprising, in combination, a cell cover of elastic material having an opening therethrough and a storage battery terminal post projecting through said opening and having spaced shoulders or collars bearing against opposite sides of said cover adjacent said opening, and another collar on said post in said opening intermediate said shoulders or collars.

10. A post and cover seal for storage batteries comprising, in combination, a cell cover of elastic material having a hole therethrough, said hole having an interior groove in the wall thereof, and a storage battery terminal post projecting through said hole and having spaced collars bearing against opposite sides of said cover adjacent said hole, and also having another collar between said spaced collars adapted to fit in said groove in the wall of said hole.

In testimony whereof, I affix my signature.

WALTER E. GOSSLING.